Feb. 17, 1953  J. M. NEILS  2,628,358
BABY CARRIER
Filed Nov. 4, 1949
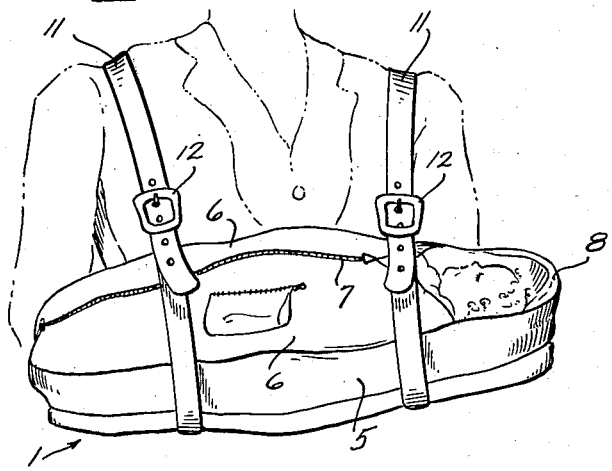
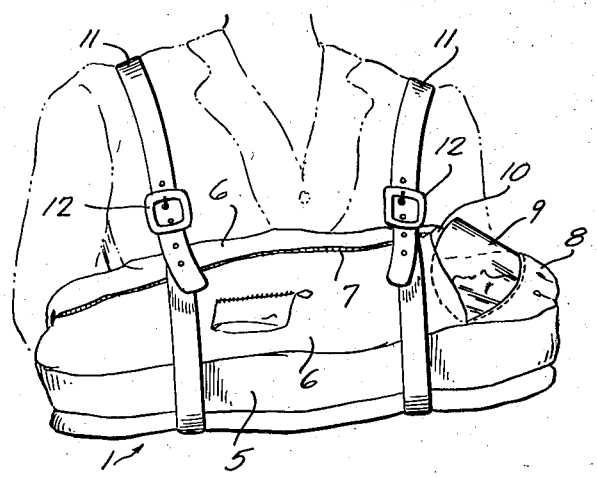
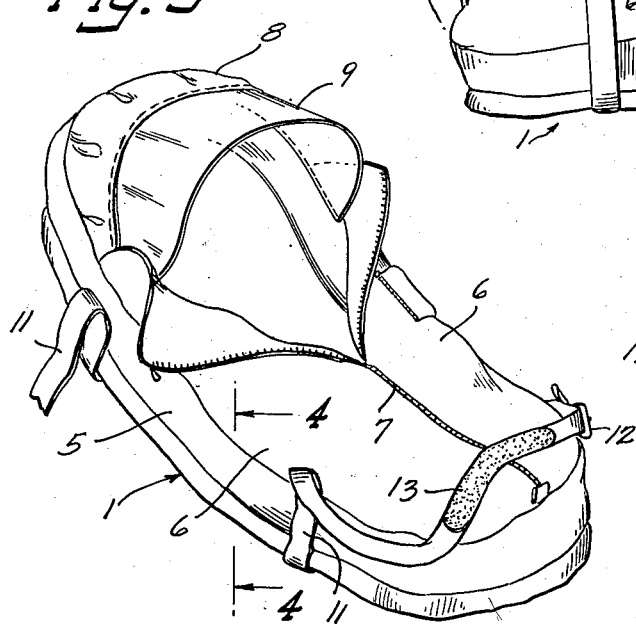
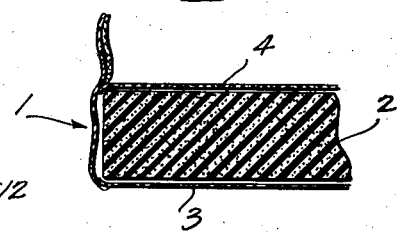
INVENTOR.
Josette M. Neils
BY
Arthur R. Woolfolk
Attorney Patented Feb. 17, 1953

2,628,358

UNITED STATES PATENT OFFICE 2,628,358

BABY CARRIER

Josette M. Neils, Milwaukee, Wis.

Application November 4, 1949, Serial No. 125,409

1 Claim. (Cl. 2—69.5)

This invention relates to a baby carrier.

Objects of this invention are to provide a novel, simple, and effective baby carrier which may be used with the utmost convenience and which will provide comfort, both for the mother and for the baby.

Further objects of this invention are to provide a baby carrier which is so constructed that the baby may be placed on the carrier with straps passing over the mother's shoulders and adjusted to the exact length desired for maximum comfort to the mother, with the baby either partially covered or substantially wholly covered depending on the condition of the weather, means being provided whereby a transparent visor or shield may or may not be used as required by the condition of the weather to thus allow visibility both for the baby and the mother under all conditions even when the baby's face is shielded by the transparent visor from rain, snow, or cold winds.

Further objects are to provide a baby carrier in which the base or bottom portion is formed of sponge or foam rubber, and in which the entire structure is covered in its major parts by a waterproof leatherette or similar material, thus providing easy cleaning or washing of the device.

An embodiment of the invention is shown in the accompanying drawings, in which—

Figure 1 is a view showing the baby carrier with the baby in position and with the baby's head uncovered.

Figure 2 is a view showing the transparent visor in position.

Figure 3 is a view of the device partly opened up.

Figure 4 is a sectional view drawn to an enlarged scale and taken on the line 4—4 of Figure 3.

Referring to the drawings, it will be seen that the device comprises a bottom portion indicated generally by the reference character 1 which has sufficient rigidity to retain its shape but yet which is yielding and provides a soft cushion-like support for the baby. Preferably, the body portion is formed primarily of a section of sponge rubber 2 which is enclosed between a base sheet 3 and a top sheet 4 of waterproof, flexible material, such as a suitable leatherette or other material of this nature. The sides extend upwardly to provide a reinforced or thicker upstanding flange or marginal portion 5. Above the marginal portion, a pair of side flaps 6 extend inwardly and are provided with detachable fastening means, such as zippers 7 for example, whereby they may be secured together or freely detached.

In addition to the above structure, the head portion of the device is provided with a freely flexible head band 8 which has a relatively stiffer transparent visor 9 formed of suitable plastic or similar material. This head band or head portion 8 and the visor 9 may be folded down beneath the head of the baby when the weather is mild, for example they may occupy the position indicated by the position of the baby in Figure 1. In this condition, the visor and head band are pushed down against the body of the device and the baby's head rests on the visor and head band. On the other hand, if it is desired to shield the baby's face, the visor and head portion may be rocked upwardly to the position shown in Figure 2 and when the two side flaps or cover flaps 6 are secured together by means of the fastening means or zipper 7 it will be seen that they draw the inner marginal portions of the visor towards each other and thus cause the visor to open out away from the side flaps 6 as shown in Figure 2 to thus provide a breathing space or vent space 10.

It is to be noted that the side flaps 6 overlap the side portions of the visor 9.

A pair of continuous straps 11 are provided and extend completely across beneath the body portion of the device to provide strength and to insure against any possible loosening due to wear of the stitching or other securing means employed to attach the straps to the body portion. These straps are provided with buckles 12 so that they may be freely adjusted to the exact demands of the user. Preferably, the straps are lined with sponge or foam rubber 13 on their under sides at the portions thereof which pass over the shoulders of the user. This not only provides cushioning for the straps but primarily prevents their slipping off the shoulders of the user.

It will be seen that a novel form of baby carrier has been provided by this invention which is relatively simple to make and which is convenient to use and provides several ways in which the baby may be carried. For example, in very mild weather, the flaps 6, head band 8, and visor 9 may be all rocked down against the bottom of the device and the baby may be placed thereon. On the other hand, the baby may be partially covered, as in Figure 1, by using the side flaps or cover flaps 6 alone or again the baby may be substantially completely covered by bringing into place, in addition to the side flaps 6, the visor 9 and head band 8.

Although this invention has been described in considerable detail, it is to be understood that such description is intended as illustrative rather than limiting as the invention may be variously embodied and is to be interpreted as claimed.

I claim:

A baby carrier comprising a body portion arranged to support the baby in a horizontal position, an upstanding marginal flange portion projecting upwardly from the body portion, a pair of flaps secured to the marginal flange portion, fastening means for detachably fastening said flaps together, and a hood portion secured to the body portion adjacent one end of the body portion and arranged to be rocked upwardly to provide a hood for the baby's head extending over the face of the baby or to be rocked downwardly beneath the baby's head, said hood portion being located inwardly of said pair of flaps and arranged to be held in a slightly spaced position from the ends of said flaps to provide a breathing space for the baby, said hood portion including a freely flexible band portion and a transparent visor portion, said freely flexible band being secured to the inner edge of said visor portion and to said marginal portion.

JOSETTE M. NEILS.

REFERENCES CITED

The following references are of record in the file of this patent:

UNITED STATES PATENTS

| Number | Name | Date |
|---|---|---|
| 278,437 | Lancaster | May 29, 1883 |
| 598,995 | Jacob | Feb. 15, 1898 |
| 981,738 | Andrus | Jan. 17, 1911 |
| 1,940,224 | Munro | Dec. 19, 1933 |
| 2,269,700 | Petrucelli | May 10, 1949 |
| 2,551,509 | Smith | May 1, 1951 |

FOREIGN PATENTS

| Number | Country | Date |
|---|---|---|
| 198,942 | Germany | June 4, 1933 |